US012299984B2

(12) United States Patent
Younessian

(10) Patent No.: US 12,299,984 B2
(45) Date of Patent: May 13, 2025

(54) SYSTEMS, METHODS, AND APPARATUSES FOR SELECTING/GENERATING VISUAL REPRESENTATIONS OF MEDIA CONTENT

(71) Applicant: Comcast Cable Communications, LLC, Philadelphia, PA (US)

(72) Inventor: Ehsan Younessian, Washington, DC (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/843,250

(22) Filed: Jun. 17, 2022

(65) Prior Publication Data
US 2023/0410508 A1    Dec. 21, 2023

(51) Int. Cl.
*H04N 21/482* (2011.01)
*G06V 20/40* (2022.01)
*H04N 21/44* (2011.01)

(52) U.S. Cl.
CPC .............. *G06V 20/46* (2022.01); *G06V 20/41* (2022.01); *H04N 21/44008* (2013.01); *H04N 21/482* (2013.01)

(58) Field of Classification Search
None
See application file for complete search history.

(56) References Cited

U.S. PATENT DOCUMENTS

| | | | |
|---|---|---|---|
| 2002/0080276 A1 | 6/2002 | Mori et al. | |
| 2016/0140997 A1 | 5/2016 | Sinha et al. | |
| 2018/0084309 A1* | 3/2018 | Katz | G06V 10/82 |
| 2019/0019535 A1 | 1/2019 | Elsner | |
| 2020/0045222 A1* | 2/2020 | Franzius | H04N 23/64 |
| 2021/0003420 A1* | 1/2021 | Hamperl | G01C 21/3602 |

* cited by examiner

*Primary Examiner* — Samira Monshi
(74) *Attorney, Agent, or Firm* — Banner & Witcoff, Ltd.

(57) ABSTRACT

Content items may be represented in a listing by one or more thumbnails containing images from the content items. The images of a content item may be processed to recognize persons and/or objects, and frames of the content item may be selected based on interest values of the recognized persons and/or objects. For example, frames may be selected based on having uncommon (rare) objects and/or common (popular) persons.

23 Claims, 11 Drawing Sheets

Media Content Items 400 (e.g., collections of movies, TV shows, etc.)

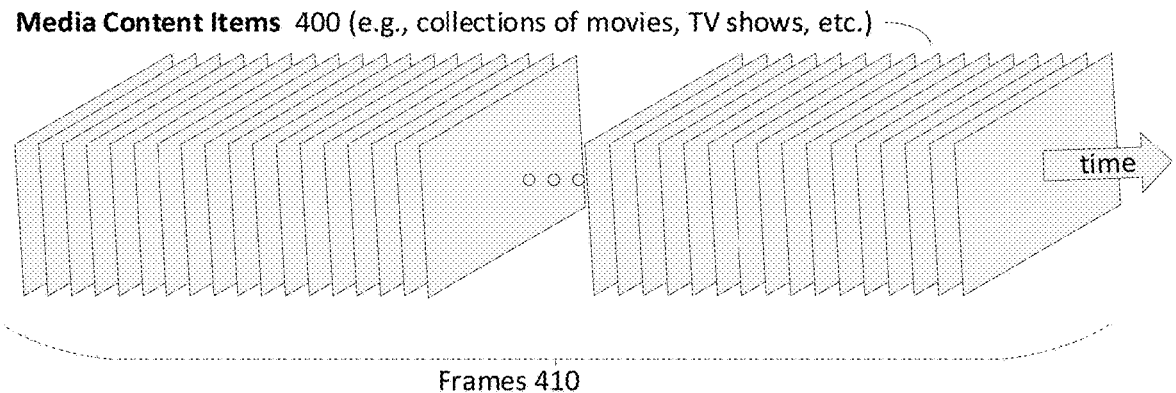

Frames 410

440

| Person 430 | Quantity of times recognized in the media content | Interest value | Object 420 | Quantity of times recognized in the media content | Interest value |
|---|---|---|---|---|---|
| Charlton Heston | 1000 | 10 | Boat | 100 | 1/10 |
| Elizabeth Taylor | 978 | 9.78 | Rat | 200 | 1/20 |
| Betty White | 952 | 9.52 | Chariot | 1000 | 1/100 |
| Mickey Mouse | 753 | 7.53 | Horse | 2000 | 1/200 |
| Donald Duck | 719 | 7.19 | Fish | 3800 | 1/380 |
| Lightning McQueen | 689 | 6.89 | Ping Pong Table | 5000 | 1/500 |
| SpongeBob | 687 | 6.87 | Sea | 10000 | 1/1000 |
| Larry King | 650 | 6.50 | Beach Vacation | 17400 | 1/1740 |
| Bender | 629 | 6.29 | World Map | 20000 | 1/2000 |
| David Schwimmer | 600 | 6.00 | Dog | 29800 | 1/2980 |
| Ariel | 573 | 5.73 | Food | 30000 | 1/3000 |
| Bill Clinton | 500 | 5.00 | Dining | 34500 | 1/3450 |
| Homer Simpson | 456 | 4.56 | Couch | 64300 | 1/6430 |
| Ariel | 412 | 4.12 | Table | 72700 | 1/7270 |
| Cogsworth | 33 | 0.33 | Car | 100000 | 1/10000 |

More popular / More un-common/rare

FIG. 4

| Input Sources | Types | Quantity of different objects or people | Examples |
|---|---|---|---|
| Video (sampled frame 1 fps) | Visual Object/Concept | 1681 | dog, computer, car, mask, jeep |
| | Place/Location | 365 | music studio, baseball field, beauty salon |
| | Emotion | 5 | sad, angry, happy, neutral, surprised |
| | Logo | 290 | Target, Walmart, Costco, Amazon |
| | People | 45,460 | Audrey Hepburn, Matt Damon, Julia Roberts, George Clooney, Sandra Bullock, Johnny Depp, Judy Garland, Clint Eastwood, SpongeBob, Unknown-A |
| Audio | Audio Concept | 562 | violence, guitar, vehicle, horse, gun fire |
| | Audio Emotion | 2 | arousal, velocity |
| Text (closed caption, on-screen OCR transcript) | Key Term | English Dictionary | salad, cocktails, substance abuse |
| | Brand Name | 3500 | Geico, Amazon, Target |
| | Name Entity | English Dictionary | Obama, Arizona, Spain |
| | Topic | 35 | politics, music, education |
| | Brand Safety | 3 | hate speech, offensive language, violence |

FIG. 5

TV Show A: Genre (e.g., talk shows such as Larry King Live) based adjustment(s) of interest value(s)

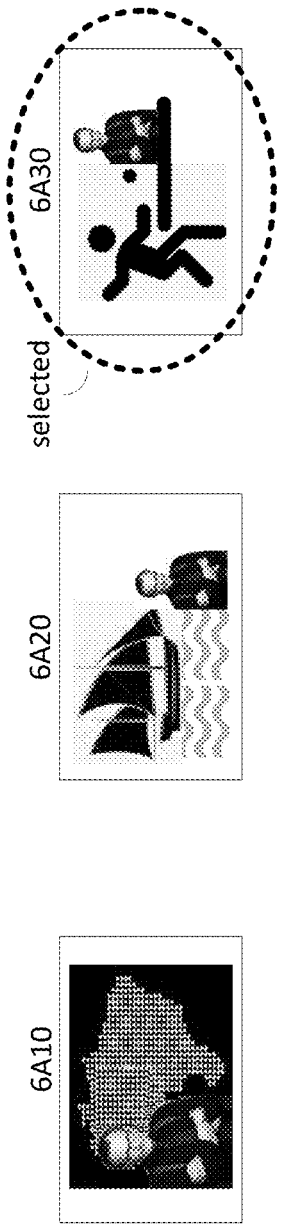

| Frame No. | 6A10 | 6A20 | 6A30 |
|---|---|---|---|
| Interest value for person(s) | Larry King: 6.5 | Larry King: 6.5 | Bill Clinton: 5.0<br>Larry King: 6.5 |
| Interest value for object(s) | World Map: 1/2000 | Boat: 1/10<br>Sea: 1/1000 | Ping Pong Table: 1/500 |
| Weighted Interest value based on Genre | Larry King: 6.5 x 1.45 (weight) = 9.425 | Larry King: 6.5 x 1.45 (weight) = 9.425 | Bill Clinton: 5.0 x 4 (weight) = 20<br>Larry King: 6.5 x 1.45 (weight) = 9.425 |
| Total interest value | (1/2000) + 9.425 = 9.4255 | (1/10) + (1/1000) + 9.425 = 9.526 | (1/500) + 20 + 9.425 = 29.427 |

TV Show B: interest value(s) based on user's preference selected → 6B30

| Key-Frame No. | 6B10 | 6B20 | 6B30 |
|---|---|---|---|
| Interest value for person(s) based on user's preference | David Schwimmer: 6.00 + 1.00 = 7.00 | 0 | David Schwimmer: 6.00 + 1.00 = 7.00 |
| Interest value for object(s) based on user's preference | Couch: (1/6430) x 100 = 0.0156<br>Table: (1/7270) x 200 = 0.0275 | Dining: (1/3450) x 100 = 0.0290 | Beach Vacation: (1/1740) x 300 = 0.1724 |
| Total interest value | 7.00 + 0.0156 + 0.0275 = 7.0431 | 0 + 0.0290 = 0.0290 | 7.00 + 0.1724 = 7.1724 |

6B00

SYSTEMS, METHODS, AND APPARATUSES FOR SELECTING/GENERATING VISUAL REPRESENTATIONS OF MEDIA CONTENT

BACKGROUND

A program listing for media content (e.g., movies, episodes of TV series, video clips, etc.) may include thumbnails to assist with user identification of the media content. Some images may be more useful than others for allowing a user to quickly determine whether they are interested in a content item, and the choice of what images to use for the thumbnails may cause the program listing to be more, or less, effective.

SUMMARY

The following summary presents a simplified summary of certain features. The summary is not an extensive overview and is not intended to identify key or critical elements.

Systems, apparatuses, and methods are described for reviewing frames of media content and selecting frames for use as visual representations (e.g., thumbnails) of the media content. The content of the frames may be analyzed for its popularity or rarity/uniqueness to increase the likelihood of selecting images that will capture the attention of users. For example, frames depicting popular people and rare/unique objects may be of greater interest to users, and may be more likely to be selected for use as thumbnails. Thumbnails may be dynamically updated based on changing popularity, rarity/uniqueness, etc. By providing thumbnails of greater interest, the user may more quickly identify and select content items, and may reduce resources consumed by the process of browsing content. These and other features and advantages are described in greater detail below.

BRIEF DESCRIPTION OF THE DRAWINGS

Some features are shown by way of example, and not by limitation, in the accompanying drawings In the drawings, like numerals reference similar elements.

FIG. 4 shows an example table indicating interest values for different types of people and objects.

FIG. 5 shows an example of categorization of people and objects.

FIG. 6A shows an example of a frame selection process using weighting based on genre.

DETAILED DESCRIPTION

Figure 1:
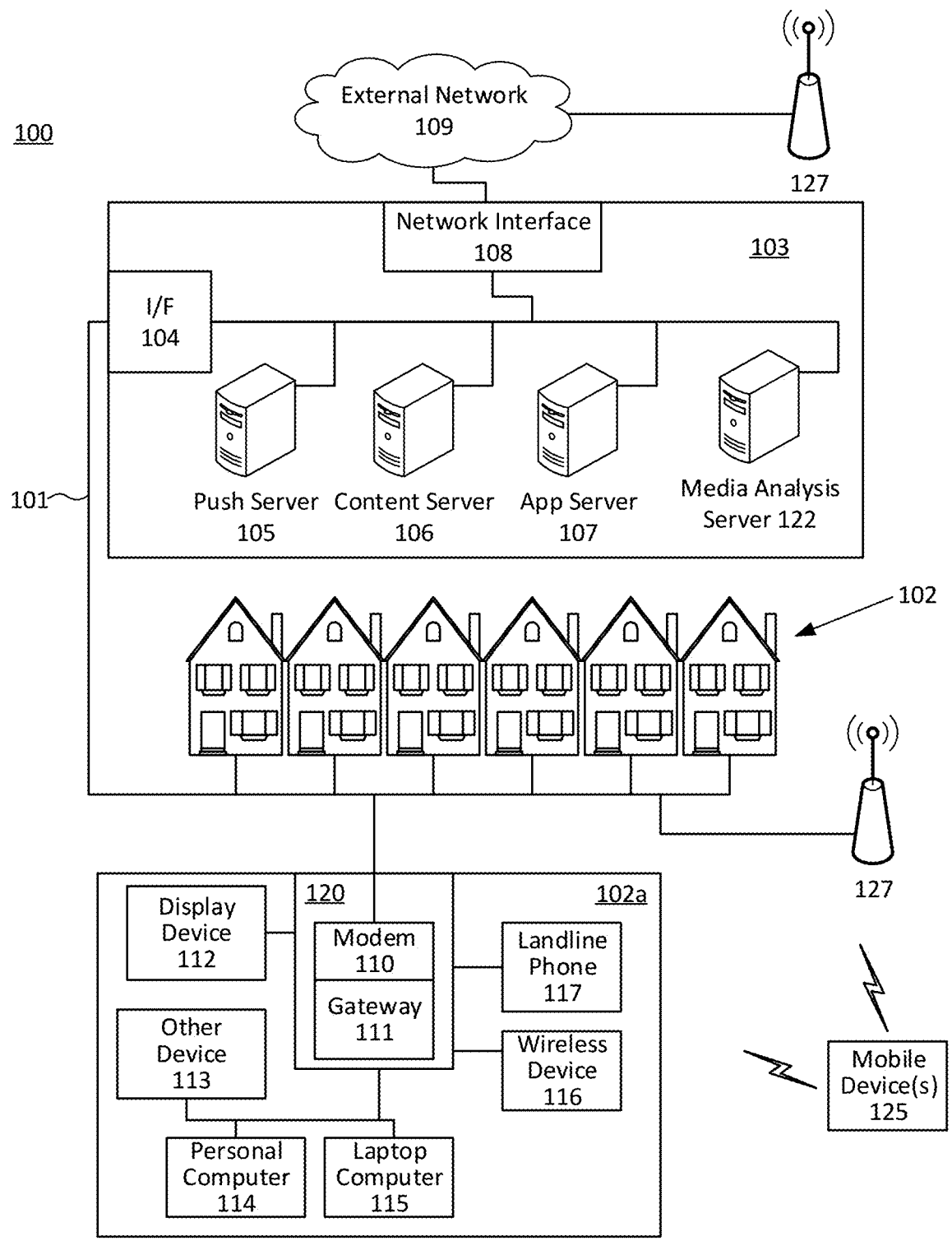
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107 and 122, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as the media analysis server 122 (described below), additional push, content, and/or application servers, and/or other types of servers. Although shown separately, the push server 105, the content server 106, the application server 107, the media analysis server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein. Although the servers 105, 106, 107, and 122 are illustrated in FIG. 1 as separate servers, the functions of these servers may be integrated into any of other servers (e.g., the function of the media analysis server 122 may be integrated into any of the other elements, such as the content server 106).

The media analysis server 122 may receive and analyze media content received from the content server 106. For example, the media analysis server 122 may perform analysis of images in frames of the media content, to identify frames that have objects that may be the most interesting to potential users, and those frames may be selected as thumbnails to represent the media content in a visual listing of media content. For example, a movie listing may use a thumbnail showing a scene with a popular person (e.g., a celebrity who shows up often in the media content) and/or an un-common object (e.g., a unique or rare object which shows up rarely in the media content, for example, a spaceship, a sphinx, etc.). By selecting frames of higher interest, the program listing may allow a user to more efficiently find and select a content item of interest, and reduce time and transmission/processing resources spent in browsing the program listing.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device. The gateway 111, and/or another computing device at a premises 102, may interface with the media analysis server 122. The media analysis server 122 may send thumbnails to one or more computing devices (e.g., display device 112, personal computer 114, laptop computer 115) at the premises 102. The one or more computing devices may display the thumbnails for users' view and/or selection.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
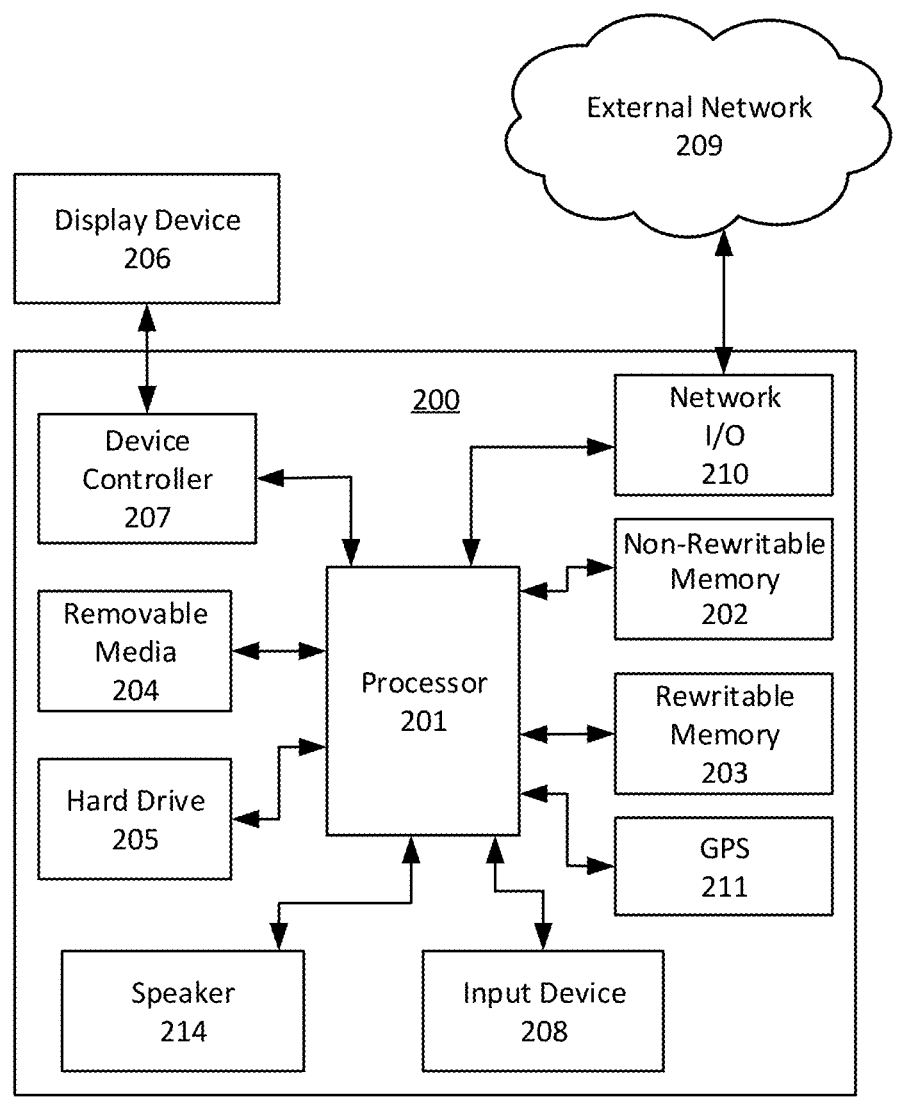
FIG. 2 shows example hardware elements of an example computing device.

FIG. 2 shows example hardware elements of an example computing device. The example hardware elements may be of a computing device 200 used to implement any of the computing devices shown in FIG. 1 (e.g., the mobile devices 125, any of the devices shown in the premises 102a, any of the devices shown in the local office 103, any of the wireless access points 127, any devices with the external network 109) and may be of any other computing devices discussed herein. The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein (e.g., the content server 106, the media analysis server 122, display device 112, personal computer 114, laptop computer 115). For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (IC s). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Thumbnails generated by the features described herein may enable viewers to discover and choose media content, which the viewers may actually end up liking, with less amount of time spent browsing through a program listing. Since browsing program listings may consume network resources in retrieving available content items, conducting searches based on user-selected criteria, etc., reducing that time can save resources (e.g., processing resources, transmission resources, radio bandwidths, transmission powers, etc.). Further, frame selection may use individual user profiles, if available, to help further improve the likelihood of using frames that will attract the user's attention. Moreover, thumbnails may be periodically updated based on the media content that may have been updated with additional data (e.g., newly released movies, new TV series, new video games, etc.) since from the last thumbnail generation. Such thumbnails may reflect the latest trends in the media content and may generate viewer interests more effectively.

Figure 3A:
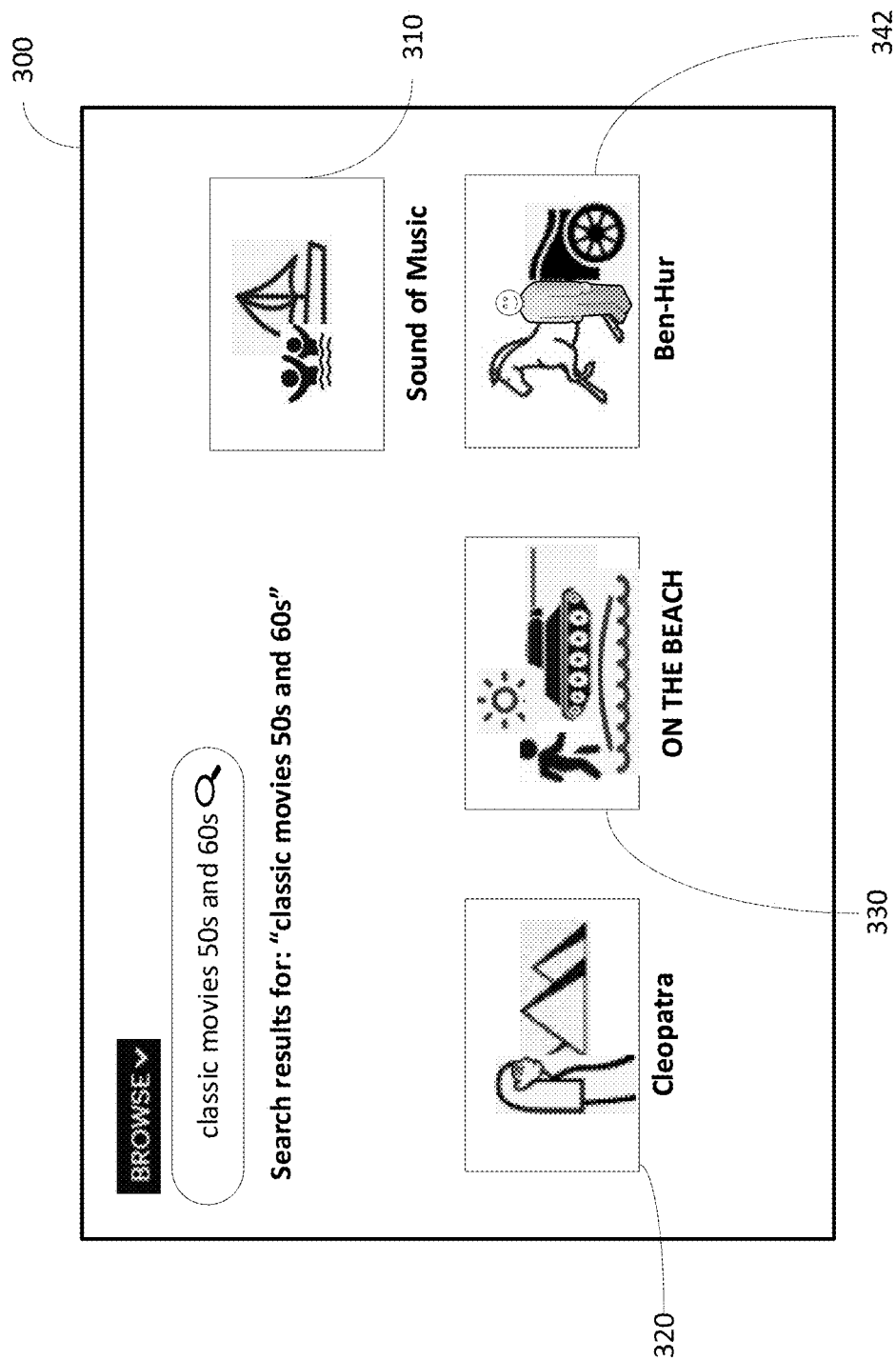
FIG. 3A shows an example of a user interface for browsing media content.

FIG. 3A shows an example of a user interface 300 (e.g., display screens of TV, desktop, laptop, smartphone, etc.) for browsing media content. The user interface 300 may be used to browse a media content provider's website for media content (e.g., movies, TV series or programs, short video clips, video games, etc.). In the illustrated example, the user has requested a search for "classic movies of the 1950s and 1960s," and the search results list several movies ("Sound of Music," "Cleopatra," etc.). The user interface 300 may use thumbnails to represent the movies. To increase user engagement and assist users with quickly identifying media content of interest, interesting video frames from the movies as the thumbnails may be selected to represent the movies, for example, based on popularity of people and/or un-commonality of object(s).

The video frames selected for each movie, as thumbnails 310, 320, 330, and 342, may be selected based on interest levels of the various people and objects in those frames. For example, thumbnail 310 may be selected because of a popular person (e.g., Elizabeth Taylor) and an uncommon object (e.g., Pyramid). For example, thumbnail 342 may be selected because of a popular person (e.g., Charlton Heston) and an uncommon object (e.g., Chariot). To determine these interest levels, the present system may access a database of interest values for various people and objects that may be found across various media content items (e.g., in a large universe of movies). The interest values may be based on how frequently the people or objects have appeared in various media content items (e.g., by noting that Charlton Heston has appeared 1000 times across various movies and other content items). Note that an interest value may be based on appearances of a person within a movie for which a thumbnail is being generated, but the interest value is not limited to just those appearances, and may also (or alternatively) be based on appearances in content items other than the movie. However, for determining interest levels of people and objects, people may be treated differently from objects. The present system may assume that a person (e.g., Elizabeth Taylor, Charlton Heston, etc.) is more interesting if that person appears more frequently across various media content items, while an object (e.g., pyramid, chariot, etc.) is more interesting if that object appears less frequently across various media content items (e.g., is less common).

Accordingly, the frame for thumbnail 320 may be selected from frames of the movie "Cleopatra" based on the frame having an interesting person (e.g., Elizabeth Taylor, who has appeared in a lot of movies) and an interesting object (e.g., a pyramid, which does in very many movies, and is relatively uncommon and unique/rare). Likewise, the frame for thumbnail 342 may be selected from frames of the movie "Ben-Hur" based on the frame having a combination of a popular person (e.g., Charlton Heston) and uncommon object (e.g., chariot).

Figure 3B:
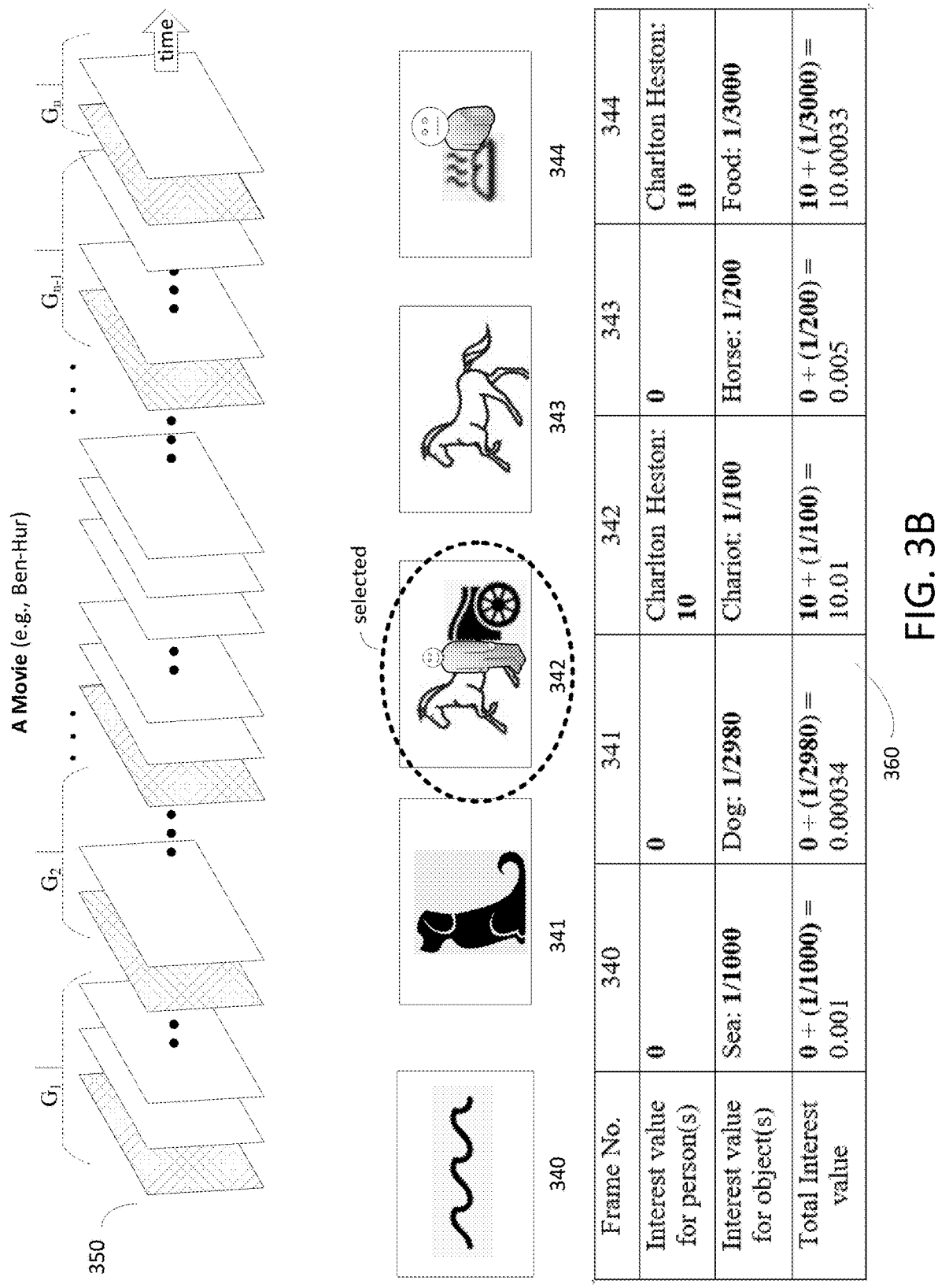
FIG. 3B shows an example of a frame selection process for a movie thumbnail.

FIG. 3B shows an example of a frame selection process for a move thumbnail. The movie (e.g., "Ben Hur") may be composed of a sequence of frames 350 in a timeline as illustrated. The frames 300 may include groups of frames (e.g., groups of pictures (GOP), Gi-G, encoded using a motion-based encoding such as MPEG), one of frames in each group being a key-frame (e.g., i-frame of GOP shown as a shaded frame). One or more key-frames may be selected as thumbnails based on people and/or objects recognized in the one or more key-frames. The evaluation of object images in the movie may focus on those frames that are key-frames, and thus may reduce processing time.

An image recognition process may be performed on those frames, and may recognize a plurality of people and/or objects in those frames. A frame having people and/or objects therein may be assigned an interest value based on how interesting the people and/or objects are, and as noted above, the interest value for the people and objects may be based on how often they are found across multiple content items. As also noted above, people and objects may be treated differently in this regard—a person may be deemed more interesting if that person appears in many content items, while an object may be deemed more interesting if that object appears in few content items.

In the FIG. 3B example, frame 340 may receive a person interest score of zero because there are no people in that frame, and an object interest score of 0.001 based on the commonality of the recognized object (e.g., sea). The values of zero and 0.001 may be relative values, with higher values indicating greater interest, and the derivation of these values will be discussed in greater detail below with respect to FIG. 4. In the FIG. 3B example, frame 341 has its interest value based on having no people and a rather common recognized object (e.g., dog). Frame 342 may have an interest value that combines an interest value of a person ("Charlton Heston" having an interest value of 10 based on that person being found across a lot of media content items) and an interest value of an object (a chariot may have an interest value of 0.01 based on chariots being found in very few media content items. Frame 343 may have an interest value that is based on no people and a horse object (having an interest value of 0.005). Frame 344 may have an interest value based on the recognized person ("Charlton Heston" having an interest value of 10) and recognized object (Food, having an interest value of 0.00033).

FIG. 4 shows an example table indicating interest values for different types of people and objects. For example, table 440 may be based on processing various media content items 400 in a library (e.g., a large library of items that was searched to produce the results shown in FIG. 3A). The table 440 may be generated by processing a large quantity of media content items (e.g., many movies, television shows, etc. in a library of available content) and counting quantities of times that different people and objects appear in those media content items. Those counts of the quantities of times may then be converted to interest values appearing in table 440. For example, a scale from 0 to 10 may be used to represent interest, and the raw counts of the quantities of times may be converted to the scale. The scale may, for example, give the highest score to people who appear in more than 10% of all content items, and the scale may gradually provide lower interest values for people who appear in fewer content items (e.g., lower score for people appearing in only 8%, even lower score for people appearing in only 6%, etc.). As shown in FIG. 4, Charlton Heston has the highest interest value, 10, and this may be due to that person being recognized in a large quantity of content items. Any desired scale may be used to give higher interest values to people who appear in greater quantities of content items. Alternatively, the interest values of people may be normalized by a constant value (e.g., 10) such that a range of the interest values of people may be within 1 to 0.

Similarly, objects may be listed in table 440, with a similar scale of interest from 0 to 10, except the higher interest values may be awarded to the objects that appear the least across the various content items (e.g., highest score for objects appearing in no more than 0.01% of the content items, lower score for objects appearing in no more than 0.1% of the content items, even lower sore for objects appearing in no more than 1%, etc.). Alternatively, the interest values of objects may be multiplied by a constant value (e.g., 10) such that a range of the interest values of objects may be within 1 to 0. As illustrated, a boat has the highest interest value in the table because boats appear in very few content items in the library of available content items. A car may be given a very low interest value because cars are found in many content items. Table 440 may be consulted to assign interest values to the various people and objects that are recognized in a new content item being processed, and may also be updated to reflect those people and objects (e.g., the interest value for "chariot" may be updated if the new movie happens to have chariots, as those would increase (albeit perhaps relatively slightly) the quantity of times that chariots appear in the content items that are in the library of available content items.

The FIG. 4 example table 440 indicates popularity of persons and objects across a plurality of content items. A similar table may also, or alternatively, be generated on a per-content item basis (e.g., a movie) or a per set of content items basis (e.g., a series of TV shows). The various instances in which a person or object is found in the frames of a movie or a series of TV shows (e.g., Friends), for example, may be used to generate interest values that are relative to that movie or the series of TV shows, for selecting a thumbnail to represent that movie or series of TV shows. A content-item-specific popularity may be useful, for example, if a movie stars a lesser-known actor appearing in many scenes, but also includes a well-known actor in just one scene. Similarly, a set-of-content-items-specific popularity may be useful, for example, if a series of TV shows stars a lesser-known actor appearing in many scenes, but also includes a well-known actor in just one scene. The relatively small presence of that well-known actor may overshadow the lesser-known actor, but for purposes of selecting a thumbnail to represent the movie, some implementations may wish to have the lesser-known actor given more impact. To that end, the interest values in the table 440 may be used together with interest values in a movie-specific table or a series-of-shows specific table when determining interest values for frame selection. For example, if Cogsworth is a lesser-known actor who only appears in one movie ("Beauty and the Beast"), but has a very prominent starring role in that movie, then Cogsworth may be given a relatively low interest score in table 440 (e.g., 0.33 as illustrated), but may receive a much higher interest score in a table that is specific to that movie (e.g., 10). For selecting frames to use in a thumbnail for that movie, the system herein may use a combined interest value for Cogsworth, which may consider both the general popularity of Cogsworth (e.g., the 0.33 illustrated in table 440) and the content-item-specific popularity of Cogsworth for that movie (e.g., 10). When determining the interest values for frame selection, the system herein may multiply the Cogsworth interest values (e.g., multiplying Cogsworth's general interest value by Cogsworth's movie-specific interest value; or 0.33× 10=3.33). The general interest values in table 440, and the content-item-specific interest values, may be normalized for these calculations. For example, the normalized general interest value for Cogsworth may be the count of appearances (in the library) divided by the total quantity of persons in the overall library of content (e.g., 33 appearances divided by 100 total persons), while the movie-specific interest value for Cogsworth may divide the count of appearances (in the movie) by the total quantity of persons in the movie (e.g., 100 appearances divided by 10 persons). The numeric examples herein are just examples for illustration. Also, while the example above combines both the general interest value with the item-specific interest value, the system may be implemented to only use the content-item-specific interest values, if desired.

FIG. 5 shows an example of categorization of people and objects. For example, different categories of types of people and objects may be recognized in content items. The examples above have focused on recognizing people and objects from video 510, and as illustrated, there may be various types of objects and people recognized in that video 510. However, people and objects may also be recognized from other sources, such as audio 520 (e.g., using a voice pattern recognition process on an audio track of a content item) and text (e.g., using an optical character recognition process on screen text, a text recognition process on a closed-caption transcript, etc.). Recognized objects may comprise simple visual objects (e.g., a dog, computer, car, etc.), as well as other types of objects such as places (e.g., baseball field), logos (e.g., brand logo for TARGET), and even emotions (e.g., sad emotion recognized using facial recognition of a person appearing in the video 510). Audio objects may include particular sound patterns (e.g., gun fire, guitar, etc.), audio emotions (e.g., recognizing tone in an audio dialogue). People 430 may also be recognized by recognizing their voice using a voice pattern recognition process. Textual objects 530 may be recognized from onscreen text and/or closed-captioned transcripts, and may comprise words, brand names, topics, types of speech, etc. A number/quantity of people/objects may change as the media content 400 may change (e.g., new movie releases, new TV series, new video games, etc.).

A person may be a human being, but need not be limited as such. For example, types of people may include a person (e.g., Charlton Heston) or a person like subject such as an animated personality (e.g., Mickey Mouse, SpongeBob, etc.), an animal playing a role of one of main figures (e.g., a dog, named "Hachi," a leading figure in a 2009 American drama film, "Hachi: A Dog's Tale"), or a lifeless object animated or simulated as a living being (e.g., a car, names "Lightning McQueen" in a 2006 Disney Enterprises, Inc. film, "Cars"). For a movie or content item that provides a cast listing, the individual entries in the cast listing may all be treated as people, objects, or both.

In FIG. 4, the media content 400 may be encoded in a sequence of frames 410 in a timeline. An image recognition process may be performed on the key-frames of the frames 410 and recognize various people or objects in the key-frames. Lists of people 430 and/or nonobjects 420 in table 440 may be added and/or updated with their respective scores. As each of the key-frames may be processed from one to the next along the timeline, each time a person or object is recognized in the key-frames, a corresponding score (e.g., a scaled number/quantity of times a corresponding object image recognized in the media content 400) in the lists of people 430 and/or objects 420 may be updated.

FIG. 4 illustrates lists of people 430 and objects 420 in order of interest value, and the lists may be consulted during the frame selection process to determine interest values of frames. For example, interest values of people "Charlton Heston," "Elizabeth Tylor," "Betty White," . . . "Cogsworth" may be assigned respectively as 10, 9.78, 9.52, . . . 0.33, and may be proportional to the quantity of times the people are recognized in the various media content in a library of available media content. Interest values of objects "Boat," "Rat," "Chariot," . . . "Car" may be inversely proportional to the quantity of times the objects are recognized in the various media content in the library. An interest value (final score) of a frame may be determined based on one or more interest value(s) of person(s) ("Charlton Heston") and/or one or more interest value(s) of object(s) (e.g., "Chariot") recognized in the frame (e.g., frame 342 as shown in table 360 of FIG. 3B). A frame with a higher interest value may have a higher chance of being engaged by viewers.

The interest values shown in FIG. 4 are just examples, and they may be weighted based on various criteria. For example, the criteria may include at least user engagements, genres, and/or a user profile. The interest values may be weighted lower or higher based on user engagements (e.g., an interest value assigned to "Charlton Heston" may be lowered, for example, from 10 to 8, as user engagements with thumbnails including images of "Charlton Heston" turn out to be lower than expected), for example, based on an update interest values process as described with FIG. 7C.

The interest values may be weighted lower or higher based on the genre of the content. FIG. 6A shows an example of a frame selection process using weighting based on genre. In the frame selection process, interest values may be weighted based on the genre of the content, such as for a talk show (e.g., Larry King Live). For example, the presence of a talk show host may be less interesting that the presence of a guest on the talk show, so if the content item is a talk show, the interest values for the host and the guest may be weighted differently. For example, in Larry King Live, an interest value of the talk show host, Larry King, may be given less weight (e.g., w1=1.45) than an interest value of a guest (e.g., Bill Clinton, w2=4) participating on an interview with Larry King, since the presence of Larry King in a thumbnail is unlikely to help a user decide whether they are interested in the show, and would be of little value in differentiating different episodes of the series, while the presence of the guest will be of more interest. Such a weight biased for the guest may help the user more quickly decide whether to watch this particular episode of the talk show, and reduce resources spent on browsing for content.

In FIG. 6A, table 6A00 shows examples of calculating final scores based on a type of genre as well as person and object scores of table 440 of FIG. 4. The final score of frame 6A10 may be calculated as a sum (e.g., 9.4255) of an interest value of the world map object $(2000)^{-1}$ and a weighted interest value for Larry King (w1*6.5, w1=1.45) as the show host. The final score of frame 6A20 may be calculated as a sum (e.g., 9.526) of interest values of boat $(10)^{-1}$, sea $(1000)^{-1}$, and the weighted interest value for Larry King (9.425). The final score of frame 6A30 may be calculated as a sum (e.g., 29.427) of an interest value of ping-pong table $(500)^{-1}$, a weighted interest value for Bill Clinton as a guest (w2*5, w2=4), and the weighted interest value for Larry King (9.425).

One or more genres associated with a-frame may be classified into a genre-type, as the genres may affect the determination of how interesting certain objects may be (e.g., the fact that a famous talk show host is recognized in frames of the host's own talk show might not be very interesting for purposes of identifying an interesting thumbnail to represent the talk show, but an appearance of that talk show host in an awards show or a movie might be more interesting for purposes of the thumbnail). For example, metadata associated with the media content may include information indicating one or more genres. The one or more genres may include news programming, talk shows, game shows, variety shows, sports programming, sitcoms, docu-dramas, police procedurals, sci-fi and fantasy, soap operas, reality TV, anime, live-action animated film, or unknown. The one or more genres may be classified into one of genre-types based on common attributes of the one or more genres. For example, news programming, talk shows, game shows, variety shows, or sports programming may be classified as a genre-type 1, which may involve regular hosts or co-hosts, commentators, or announcers. Sitcoms or soap operas may be classified as a genre-type 2, which may involve main casts, ensemble casts, or guest stars. Docudramas may be classified as a genre-type 3, which may involve no host but a narrator. Reality TV or police procedurals may be classified as a genre-type 4, which may involve no regular cast, starring unknown people, or panel of judges. Anime or live-action animated film may be classified as a genre-type 5, which may involve main casts, fictional characters, or figures animated. Unknown may be classified as a genre-type 6, which may involve armature films or short promotional video clips. Different weights may be assigned to different objects recognized in a frame based on a genre-type and a role (e.g., host, guest, etc.) of corresponding object. For example, more weights may be given to a guest over a host in genre-type 1 because viewers are more likely to be interested in the guest than the host in genres (e.g., news programming, talk shows, game shows, etc.) of genre-type 1. A role of a person may be determined based on metadata associated with the media content including information indicating the role. Alternatively, the role of the person may be determined based on a quantity of times the person is recognized in the media content and a genre-type. For example, a person that has a higher quantity of times recognized in the media content of genre-type 1 may be determined to be a host (e.g., a host of a talk show may appear most often than any other person in the talk show) Likewise, a person that has a lower quantity of times recognized in the media content of genre-type 1 may be determined to be a guest.

To avoid overrating a frame, there may be a limit optionally imposed on the interest value given to a frame a crowd of people or objects are detected in the frame. A crowd may be recognized if a quantity of people and/or objects recognized in a frame satisfies (e.g., exceeds) a threshold quantity. In that situation, the interest value for the various people and/or objects in the crowd may be reduced by a weight factor. Alternatively or additionally, people and/or objects clustered as a crowd may be treated collectively as a singular object (e.g., a "crowd of people" object).

The weighting may also, or alternatively, be assigned based on the user's particular interests. For example, a particular viewer may have a particular interest in certain people(s) and/or objects(s). Interest values assigned to frames including such people and/or objects may be adjusted for the particular user if a user profile is available, and indicates one or more preferences of the user.

Figure 6B:
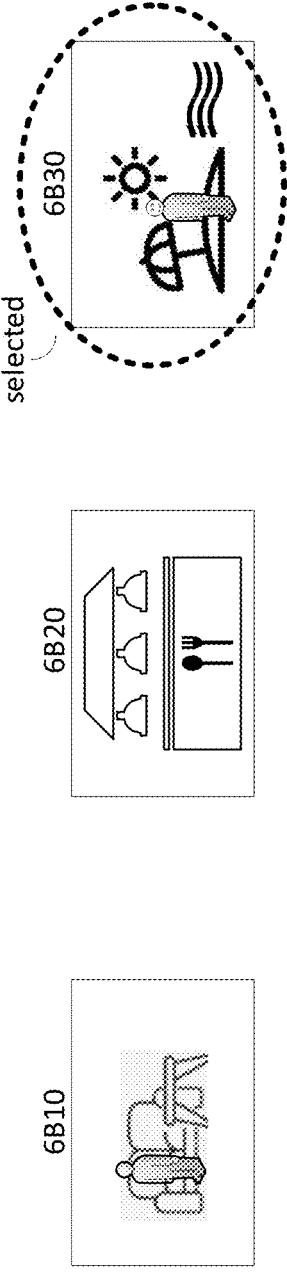
FIG. 6B shows an example of a frame selection process using weighting based on user preference.

FIG. 6B shows an example of a frame selection process using weighting based on user preference. In the frame selection process, a user profile that indicates a user has a preference for certain objects, such as couches and tables, may be used. The user profile may include a user's viewing or browsing history (e.g., movies or TV programs viewed or browsed by a user within a period of time), a user's age, gender, ethnicity, language, education, address, career, religion, etc.), and may indicate that the user has an interest in couches and tables by virtue of a recent purchasing history. If the user profile is available, adjusting interest values of people and/or objects may yield more realistic interest values for that user. For example, interest values of objects "couch" and "table" according to table 440 (1/6430 and 1/7270 respectively) may be changed to adjusted values (100/6430 and 200/7270, respectively), optionally based on the user's shopping history of couch and table, which reveals that the user likes couch and table. For example, an interest value of a person, "David Schwimmer" according to table 440 (6.00) may be changed to an adjusted value (7.00), optionally based on the user's viewing history, which reveals that the user is a "David Schwimmer" fan. For example, interest values of objects "dining" and "beach vacation" according to table 440 (1/3450 and 1/1740 respectively) may be changed to adjusted values (100/3450 and 300/1740 respectively), optionally based on the user's browsing history of browsing subject matter of dining and beach vacation. The final scores of frames 6B10, 6B20, and 6B30 may be determined based on sums of adjusted interest values of people and/or objects, as shown in table 6B00. Alternatively or additionally, the final scores of frames can be further combined with other scores calculated based on aesthetic appeals and/or clarity (e.g., not being blurry) for frame selection.

Figure 7A:
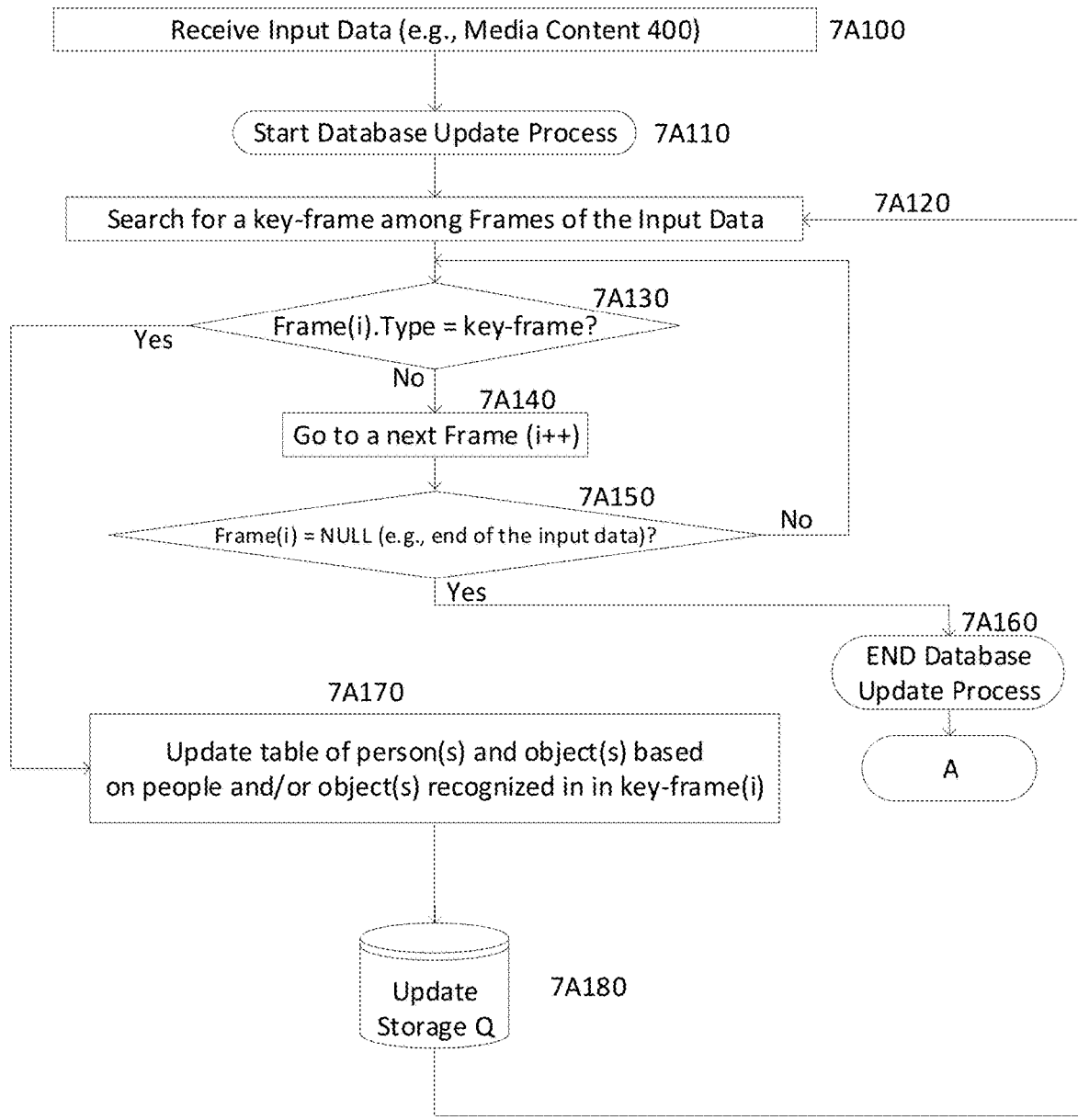
FIG. 7A-7C is a flow chart showing an example process for tracking people and objects and selecting frames for use as thumbnails.
Figure 7B:
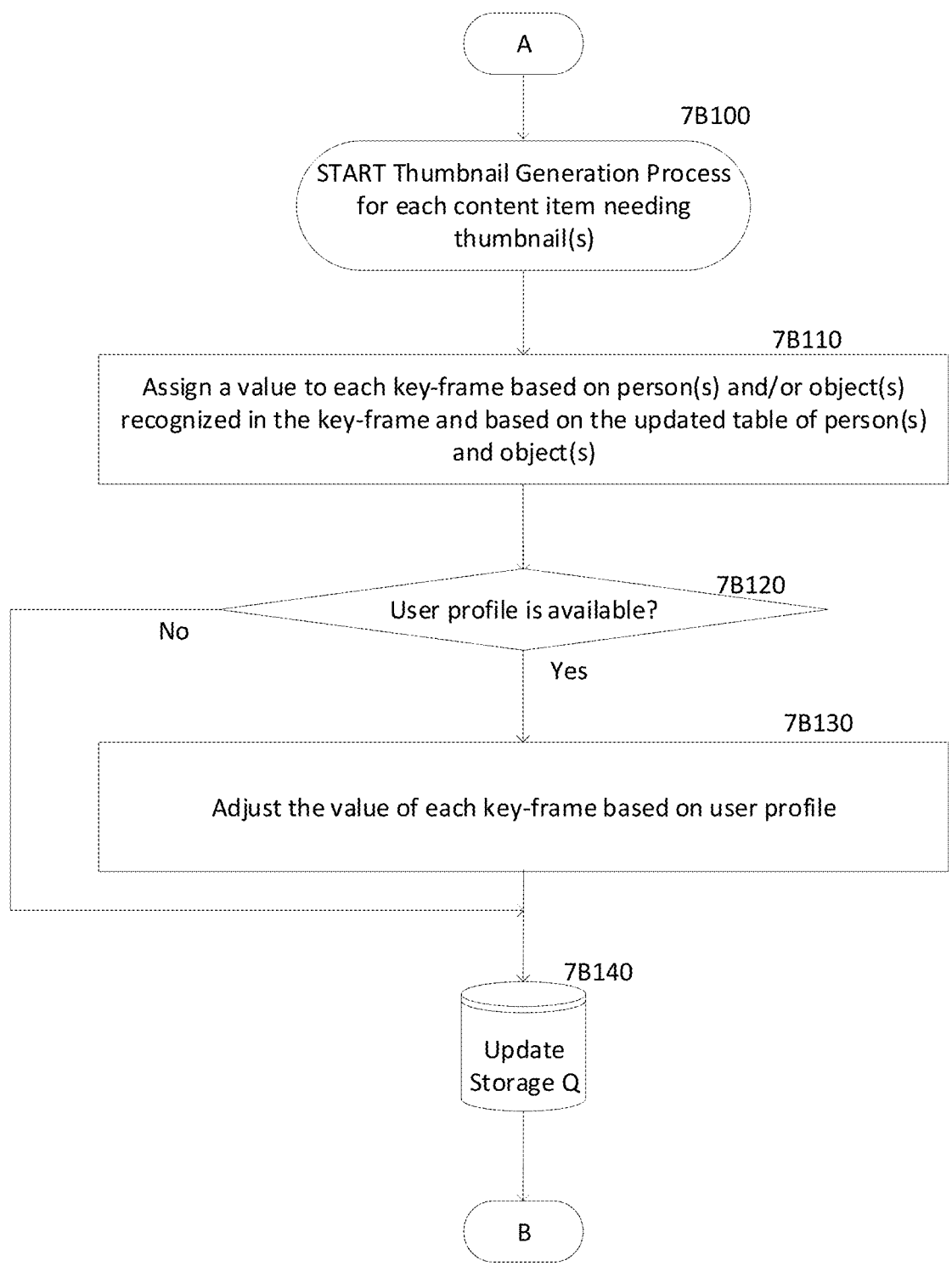
Figure 7C:
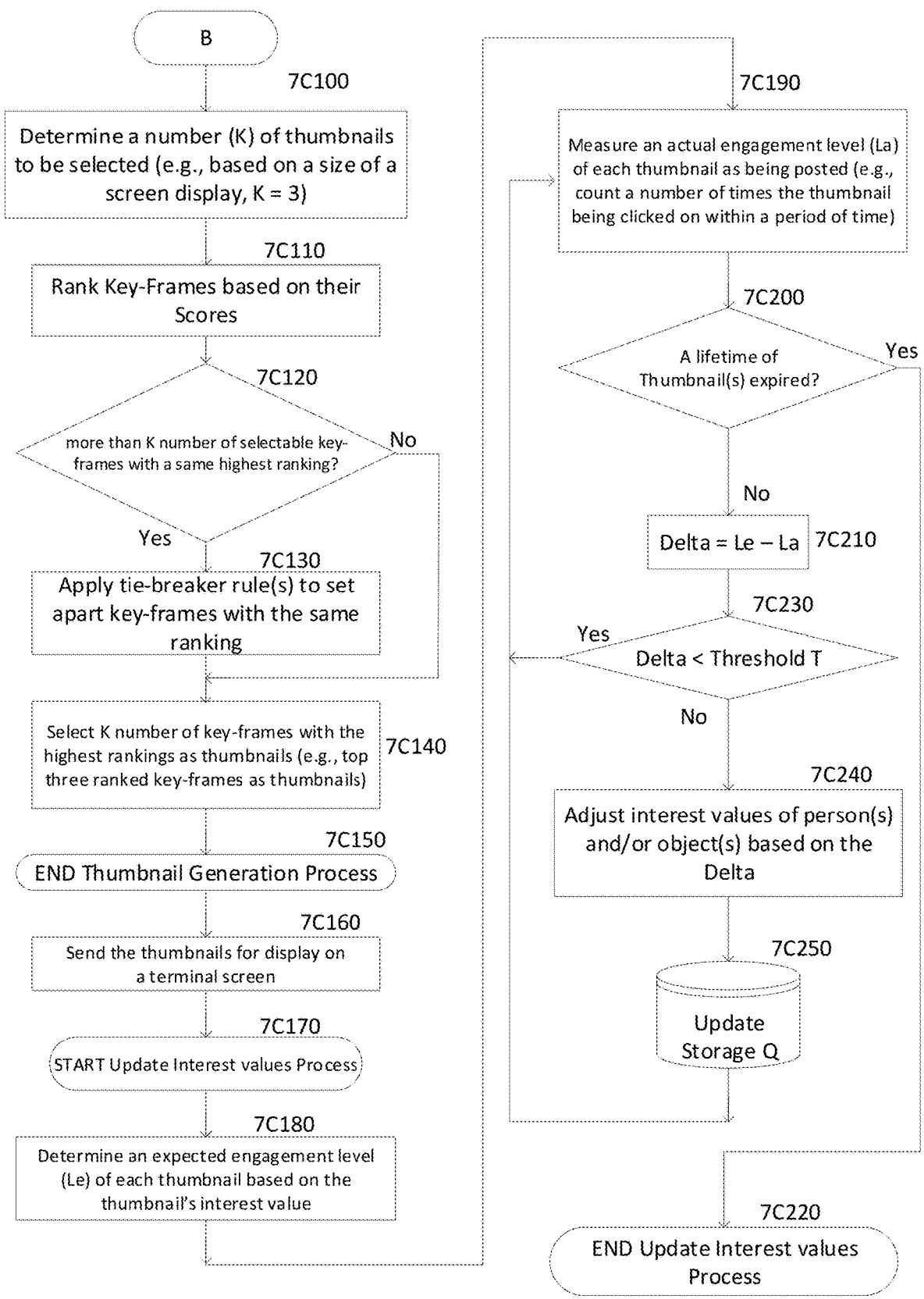

FIGS. 7A-7C is a flow chart showing an example process for tracking any type of items (e.g., people and objects) and selecting frames for use as thumbnails. The example process (e.g., a thumbnail process) may be implemented by any of the devices described herein (e.g., the media analysis server 122). The overall process may comprise a database update process for counting quantities of times that people and objects are recognized (FIG. 7A), a thumbnail selection/generation process (FIG. 7B) for selecting a particular frame for use as a thumbnail, and an update interest values process (FIG. 7C) for updating the table 440 of interest values based on recognized people and/or objects. In the database update process (FIG. 7A), media content may be processed (e.g., by an image recognition process) to create and/or update database (e.g., table 440 of FIG. 4) including lists of people and objects that are recognized among the various content items in a library of available content. In the thumbnail generation process (FIG. 7B), interest values of frames (e.g., i-frames) of a media content item that is to be represented by a thumbnail in a program listing may be determined based on people and/or objects listed in the database. Frames may be selected from the media content item based on their interest values. In the update interest values process (FIG. 7C), levels of user engagements with thumbnails may be measured, and interest values of people and/or objects in the database may be adjusted based on the measured levels of user engagements.

In FIG. 7A, at step 7A100, a new media content item (e.g., a new movie is added to a library of the media content 400) may be received (e.g., by content server 106 or media analysis server 122) and a database update process may be started at step 7A110, in order to identify objects in frames of the media content to prepare for possible use as thumbnails. At step 7A120, a looping process may begin to examine each frame in the media content item, and in step 7A120 a next frame may be identified. If the system is configured to focus only on key frames, then at step 7A130, a type of a frame (e.g., frame(i), i=0) may be determined as a key-frame (e.g., i-frame of GOP) or not key-frame. Alternatively, the system may process all frames, if desired. Any frame of the media content 400 may be examined for the thumbnail generation process, although for video that is encoded using motion-based encoding, such as MPEG, it may be desirable to limit the frame candidates to the independent frames (i-frames), as other dependent frames are typically very similar to their corresponding i-frame, and identifying people and/or objects in those similar frames may lead to redundant processing effort. A counter (e.g., "i") may be used to designate different frames in the media content 400, and if a current frame is not a key-frame, then the process may increment the counter to check the next frame (e.g., frame(i), i=i+1). If there is no next frame (e.g., the process has completed processing all frames in the media content 400), then at step 7A150, the next frame may not exist (e.g., NULL at the end of the input data) and the database update process may end at step 7A160. If there is a next frame in the media content 400, then at step 7A150, the process may return to step 7A130 to determine whether that next frame is a key-frame. At step 7A130, if a type of a frame is a key-frame, the process may proceed to step 7A170. At step 7A170, a people and/or objects may be recognized in that key-frame. This may entail using an image pattern recognition process to identify images of known people and objects. This may entail using an audio pattern recognition process to identify sounds of known people and objects. This may entail using optical character recognition to recognize words appearing in the frame, and/or text recognition process to recognize words in a transcript (e.g., closed-caption feed for the movie). At step 7A180, database (e.g., table 440 of FIG. 4) may be updated based on the people and/or objects recognized in the key-frame. For example, a quantity of times (e.g., 72700) a corresponding object (e.g., table) recognized in the media content 400 may be updated (e.g., increased) in table 440. The database update process may go back to step 7A120 to search for a next key-frame, and repeat steps 7A130, 7A140, 7A170, and 7A180 until all the key-frames in the media content item (e.g., a new movie) are processed. At step 7A160, the database update process may end after processing of the media content item is completed. The thumbnail generation process may be started based on the database update process, as shown in FIG. 7B.

In FIG. 7B, at step 7B100, the thumbnail selection/generation process may start, based on the database update process completed from FIG. 7A, for each content item (a move, a TV show, etc.) needing thumbnail(s). For example, if a user has opened a program listing and requested a search for classic movies of the 50s and 60s (FIG. 3A), then a search may determine that four movies ("Sound of Music," "Cleopatra," "On the Beach," and "Ben-Hur") are to be represented in the search results. The thumbnail generation process beginning in step 7B100 may be performed for each of those four movies. At step 7B110, an interest value may be assigned to each frame (e.g., frames 340-344 in FIG. 3B) based on people and/or objects that were recognized in that frame. An interest value assigned to a frame may be adjusted based on genre(s) of the content item (e.g., frames 6A10, 6A20, 6A30 in FIG. 6A). At step 7B120, the process may determine if a user profile of a targeted viewer is available. At step 7B130, the process may adjust a value assigned to each frame based on the user profile (e.g., frames 6B10, 6B20, 6B30 in FIG. 6B). Adjusting based on the user profile may be optional. At step 7B140, the values of frames may be updated and/or stored in a storage, and the process may proceed to step 7C100 of FIG. 7C.

In FIG. 7C, at step 7C100, the thumbnail generation process may determine a number (k) of thumbnails to be selected to represent each content item in a program listing for a user (e.g., three thumbnails per a movie). For example, a screen size may allow each content item to be represented by three (3) thumbnails. At step 7C110, frames may be ranked based on their final scores, and the top k frames may be selected for use as thumbnails. At step 7C120, a determination may be made if there is a tie among the top k frames, and if there is a tie, then at step 7C130, one or more tie-breaker rules may be applied to set apart frames with the same ranking. For example, one of the frames having the same highest values may be selected by random. One of the frames having the same highest values and having the earliest timestamp may be selected. Alternatively, one of the frames having the same highest values may be selected based on compositions of their values. For example, one of the frames having the highest person interest value in may be selected. One of the frames having the highest object interest value may be selected. One of the frames having the lowest person interest value may be selected. One of the frames having the lowest object interest value may be selected. One of the frames having the minimum difference between interest values of people and interest values of object(s) may be selected (e.g., a final interest value, 10, of a frame comprising interest values of people, 5, and interest values of objects 5). One of the frames having the maximum difference between interest values of people and interest values of object(s) may be selected (e.g., a final interest value, 10, of a frame comprising interest values of people, 9, and interest values of objects 1).

At step 7C140, the k frames with the highest ranking may be selected as thumbnails and thumbnail generation process may end at step 7C150. At step 7C160, the thumbnails may be output for display on a display device (e.g., a terminal screen). A user may select one or more of the thumbnails displayed on the terminal screen (e.g., a listing of a plurality of content items represented by the thumbnails) and corresponding content item(s) may be displayed based on the user selection. The update interest values process may start at step 7C170. The update interest values process may allow an operator to observe user engagements with thumbnails in the field, and determine interest values of the thumbnails based on the observed user engagements. The update interest values process may provide feedbacks (e.g., thumbnails being more or less engaged by viewers than expected), based on the determination, and update interest values assigned to various people and/or objects so that more realistic interest values of people and/or objects may be used to select thumbnails in the future. For example, an interest value assigned to "Charlton Heston" may be lowered (e.g., from 10 to 8) as user engagements with thumbnails including images of "Charlton Heston" turn out to be lower than expected. At step 7C180, the process may determine an expected engagement level (e.g., expected number of clicks on a thumbnail per a period of time) of a thumbnail based on the thumbnail's final score. At step 7C190, the process may measure an actual engagement level (e.g., actual number of clicks on a thumbnail per a period of time). At step 7C200, the process may determine that a lifetime of a thumbnail has expired (e.g., a thumbnail is to be removed) and may end the update interest values process at step 7C220. At step 7C200, the process may determine that the lifetime of the thumbnail has not expired and perform step 7C210. At step 7C210, a difference between the expected demand level and the actual demand level over a period of time may be determined. At step 7C230, the process may determine that the difference less than a threshold level (T) and perform step 7C190 again for another period of time. Alternatively, at step 7C230, the process may determine that the difference greater than or equal to the threshold level (T), the process may perform step 7C240.

At step 7C240, the difference may be used to adjust associated interest values of people and objects, weights used to calculate weighted interest values, or interest values based on user profile. The adjustment may be made iteratively over periods of time such that a difference between the expected engagement level and the actual engagement level may eventually converge to zero or a nominal value. For applying the difference, an interest value of a frame, compositions of the interest value (e.g., interest values of people and objects), and interest values of each object images used to calculate different parts of the compositions may be stored during the thumbnail generation process. One or more of these stored values may be adjusted (e.g., by performing an inverse function) based on the difference so that the difference may converge to zero or a nominal value.

The features described herein may be used to select frames for use as thumbnails. The features may be also applied to any existing thumbnail generator process. The thumbnail generation described herein may be used to provide a quantity of thumbnail candidates for selection by any other existing thumbnail generator process, or the results of any existing thumbnail generator process may supply candidate frames for the interest value analysis. The existing thumbnail generator may have generated default thumbnails based on an existing methodology, and yet may improve quality of the default thumbnails using the features. For example, step 7B110 of FIG. 7B may be modified for the existing thumbnail generator. At the modified step 7B110, the default thumbnails may be received from the existing thumbnail generator, and a value may be assigned to each of the default thumbnails based on people and/or objects recognized in a corresponding default thumbnail and based on database (e.g., table 440) updated by the database update process. Accordingly, at step 7C110 of FIG. 7C, the default thumbnails may be ranked based on the values that are assigned according to the features described herein. Thus, the existing thumbnail generator may also benefit from the features.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
performing an image recognition process on frames of a content item, of a series, to recognize a first object;
determining a rarity of the first object relative to the series;
selecting, based on determining that the first object in the content item is rarer than a second object in the content item, a frame, of the content item, comprising the first object;
generating a visual representation of the content item, wherein the visual representation comprises the selected frame; and
causing output of the visual representation of the content item.

2. The method according to claim 1, wherein the selecting the frame of the content item comprises assigning different interest values to different types of people and/or objects recognized in the selected frame.

3. The method according to claim 1, wherein the selecting the frame of the content item comprises:
assigning a first interest value to a first type of recognized image, wherein the first interest value is set higher to higher quantities of times that the first type of recognized image is recognized in the content item; and
assigning a second interest value, to a second type of recognized image, wherein the second interest value is set lower to higher quantities of times that the second type of recognized image is recognized in the content item.

4. The method according to claim 1, wherein the selecting the frame of the content item is based on:
a first value assigned to a first type of recognized image recognized in the content item; and
a second value assigned to a second type of recognized image recognized in the content item.

5. The method according to claim 1, wherein the selecting the frame of the content item is based on:
a first value associated with a person in the content item; and
a second value associated with an object in the content item.

6. The method according to claim 1, wherein the rarity of the first object comprises a rarity of a person within a television series.

7. The method according to claim 1, wherein the selecting the frame of the content item is further based on a user profile.

8. A method comprising:
receiving image streams of a plurality of content items, wherein each image stream comprises a plurality of video frames for a corresponding content item, of a series, of the plurality of content items;
determining a rarity of a first object relative to the series in the corresponding content item;
selecting, for each of the plurality of content item and based on the first object, in the corresponding content item, being rarer than a second object in the corresponding content item, a corresponding video frame comprising the first object to represent the corresponding content item; and
causing output of a visual listing of the plurality of content items, wherein each of the plurality of content items is represented, in the visual listing, by the corresponding video frame selected for the corresponding content item.

9. The method according to claim 8, further comprising assigning different values to different types of images recognized in the pluralities of video frames.

10. The method according to claim 8, further comprising generating information indicating different interest values for different people and objects recognized in the pluralities of video frames by:
assigning a first value to people in the pluralities of video frames, wherein the first value is set higher to higher quantities of times that people are recognized in the pluralities of video frames; and
assigning a second value to objects in the pluralities of video frames, wherein the second value is set lower to higher quantities of times that objects are recognized in the pluralities of video frames.

11. The method according to claim 8, wherein the selecting the corresponding video frame comprises:
assigning a first value to a person recognized in the pluralities of video frames; and
assigning a second value to an object recognized in the pluralities of video frames.

12. The method according to claim 8, wherein the selecting the corresponding video frame comprises combining:
first interest values associated with people recognized in the pluralities of video frames; and second interest values associated with objects recognized in the pluralities of video frames.

13. The method according to claim 8, wherein the rarity of the first object comprises a rarity of an actor within a television series.

14. The method according to claim 8, wherein the selecting the corresponding video frame is further based on a user profile.

15. A method comprising:
receiving, by a computing device, information indicating a plurality of persons or objects, and for each of the persons or objects, a corresponding quantity of times that the person or object was recognized in a library of content items;
determining that a first frame, of a particular content item of a series, comprises a first object;
determining a rarity of the first object relative to the series;
determining that a second frame, of the particular content item, comprises a second object;
based on the information, based on determining that the first object was recognized, in the library, fewer times than the second object was recognized in the library, and based on determining that the first object is rarer than the second object, selecting a frame from a content item;
using the selected frame to generate an image to represent the content item in a content item listing; and
causing, based on selection of the content item from the content item listing, output of the selected content item.

16. The method according to claim 15, further comprising assigning interest values to persons and objects recognized in frames of the content item, and wherein:
higher interest values are assigned to persons that are recognized more frequently in the library of content items; and
lower interest values are assigned to objects that are recognized more frequently in the library of content items.

17. The method according to claim 15, wherein the rarity of the first object comprises a rarity of a lesser-known actor within a television series, and wherein a rarity of the second object comprises a rarity of a well-known actor within one of the television series.

18. The method according to claim 15, further comprising assigning interest values to persons and objects recognized in frames of the content item, and wherein the interest values are weighted based on a user profile.

19. The method according to claim 15, wherein the selecting the frame is also based on combining interest values of:
a person recognized in the frame; and
an object recognized in the frame.

20. The method according to claim 15, further comprising:
performing an image recognition process to recognize one or more persons or objects in the selected frame; and
sending the selected content item to a user device based on the selection of the content item from the content item listing.

21. The method according to claim 1, wherein the content item is an episode of a program series, and the selecting the frame comprising the first object is further based on a quantity of times the first object appears in the program series.

22. The method according to claim 8, wherein the visual listing comprises a listing of selectable video programs, and each of the video programs is represented by a thumbnail image of a scene from a corresponding video program.

23. The method according to claim 1, wherein the selecting is further based on a rarity of the first object relative to the series.

* * * * *